(12) United States Patent
Hsu et al.

(10) Patent No.: US 9,749,983 B2
(45) Date of Patent: Aug. 29, 2017

(54) COMMUNICATION SYSTEM, ELECTRONIC DEVICE AND COMMUNICATION METHOD

(71) Applicant: Acer Incorporated, New Taipei (TW)

(72) Inventors: Wen-Cheng Hsu, New Taipei (TW); Chao-Kuang Yang, New Taipei (TW); Jia-Ren Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 605 days.

(21) Appl. No.: 14/463,656

(22) Filed: Aug. 19, 2014

(65) Prior Publication Data

US 2015/0135083 A1 May 14, 2015

(30) Foreign Application Priority Data

Nov. 12, 2013 (TW) .............................. 102141092 A

(51) Int. Cl.
*G06F 3/048* (2013.01)
*H04W 64/00* (2009.01)

(52) U.S. Cl.
CPC ..... *H04W 64/00* (2013.01); *G06F 2203/0382* (2013.01); *G06F 2203/0384* (2013.01)

(58) Field of Classification Search
CPC ................ G06F 2203/0382; G06F 2203/0384
See application file for complete search history.

(56) References Cited

U.S. PATENT DOCUMENTS

| | | | | |
|---|---|---|---|---|
| 8,255,583 B2 * | 8/2012 | Oh | ........................ | H04N 5/765 710/15 |
| 2006/0003810 A1 * | 1/2006 | Saikyo | .................. | H04W 24/06 455/566 |
| 2008/0082646 A1 * | 4/2008 | Shenfield | ................ | H04L 67/04 709/223 |
| 2009/0132923 A1 * | 5/2009 | Han | ...................... | H04L 12/282 715/717 |
| 2011/0235466 A1 | 9/2011 | Booij et al. | | |
| 2012/0036563 A1 * | 2/2012 | Glasgow | ............... | H04L 63/083 726/5 |
| 2013/0184005 A1 * | 7/2013 | Hieronimi | ............ | G01S 5/0247 455/456.1 |

FOREIGN PATENT DOCUMENTS

| | | |
|---|---|---|
| CN | 202019386 | 10/2011 |
| CN | 102299747 | 12/2011 |
| CN | 202886595 | 4/2013 |
| CN | 103209030 | 7/2013 |
| EP | 2445126 | 4/2012 |
| WO | 2010122379 | 10/2010 |

* cited by examiner

*Primary Examiner* — Linh K Pham
(74) *Attorney, Agent, or Firm* — Jianq Chyun IP Office

(57) ABSTRACT

A communication system is provided. The communication system includes a main electronic device and an auxiliary electronic device. The auxiliary electronic device would send a connection sound wave signal. When the main electronic device receives the connection sound wave signal, the main electronic device sends a positioning signal. When the auxiliary electronic device receives the positioning signal, the auxiliary electronic device sends a positioning sound wave signal to the main electronic device. Moreover, the main electronic device determines a relative position of the auxiliary electronic device and the main electronic device according to the positioning sound wave signal, and displays an operating icon on a display unit of the main electronic device according to the relative position.

18 Claims, 5 Drawing Sheets

COMMUNICATION SYSTEM, ELECTRONIC DEVICE AND COMMUNICATION METHOD

CROSS-REFERENCE TO RELATED APPLICATION

This application claims the priority benefit of Taiwan application Serial no. 102141092, filed on Nov. 12, 2013. The entirety of the above-mentioned patent application is hereby incorporated by reference herein and made a part of this specification.

TECHNICAL FIELD

The invention relates to a communication system, and more particularly to a communication system, an electronic device in a communication system, and a communication method.

RELATED ART

As technologies advance day by day, mobile electronic devices such as smartphones, tablet computers, or notebook computers have been broadly applied in people's daily lives. With dissemination of information rapidly increasing, the user may carry multiple portable electronic devices for different uses, such as a smartphone for transmitting and receiving phone calls and messages, a tablet computers for web browsing and document viewing, a notebook computer for processing work related data, and a digital camera for capturing images and videos. According to different needs, the user may require data exchange between the portable electronic devices. However, current technology cannot allow the user to intuitively operate the portable electronic devices in order to complete the data exchange. For example, the data exchange may require mechanisms such as physical wire connections or temporary cloud storage and download by the other portable electronic device. These steps contribute significantly to inconvenience for the user.

SUMMARY OF THE INVENTION

The invention provides a communication system, an electronic device, and a communication method, capable of rapidly establishing connections between a plurality of electronic devices in the communication system, and enabling intuitive operation for the user.

A communication system according to an embodiment in the invention includes a main electronic device and a first auxiliary electronic device. The first auxiliary electronic device sends a first connection sound wave signal. When the main electronic device receives the first connection sound wave signal, the main electronic device sends a first positioning signal according to the first connection sound wave signal. When the first auxiliary electronic device receives the first positioning signal, the first auxiliary electronic device sends a first positioning sound wave signal to the main electronic device. Moreover, the main electronic device determines a first relative position of the first auxiliary electronic device and the main electronic device according to the first positioning sound wave signal, and the main electronic device displays a first operating icon on a display unit of the main electronic device according to the first relative position.

An electronic device according to an embodiment in the invention includes a communication unit, a sound wave receiving unit, a processing unit coupled to the communication unit and the sound wave receiving unit, and a display unit coupled to the processing unit. When the sound wave receiving unit receives a first connection sound wave signal, the processing unit sends a first positioning signal through the communication unit according to the first connection sound wave signal. When the processing unit receives a first positioning sound wave signal corresponding to the first positioning signal through the sound wave receiving unit, the processing unit determines a first relative position of a first auxiliary electronic device sending the first positioning sound wave signal and the electronic device according to the first positioning sound wave signal, and the processing unit controls the display unit to display a first operating icon according to the first relative position.

A communication method according to an embodiment in the invention is adapted for an electronic device in a communication system, the communication method including the following steps. When a first connection sound wave signal is received, a first positioning signal is sent according to the first connection sound wave signal. When a first positioning sound wave signal corresponding to the first positioning signal is received, a first relative position of a first auxiliary electronic device sending the first positioning sound wave signal and the electronic device is determined according to the first positioning sound wave signal. A display unit of the electronic device is then controlled to display a first operating icon according to the first relative position.

In summary, through the sound wave signals sent by the other electronic devices (e.g. the auxiliary electronic devices), the communication system, electronic device, and communication method provided by embodiments of the invention are capable of enabling an electronic device (e.g. the main electronic device) in the communication system to establish connections and determine positions, and thereby enabling intuitive operation of the electronic device for the user.

To make the above features and advantages of the invention more comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
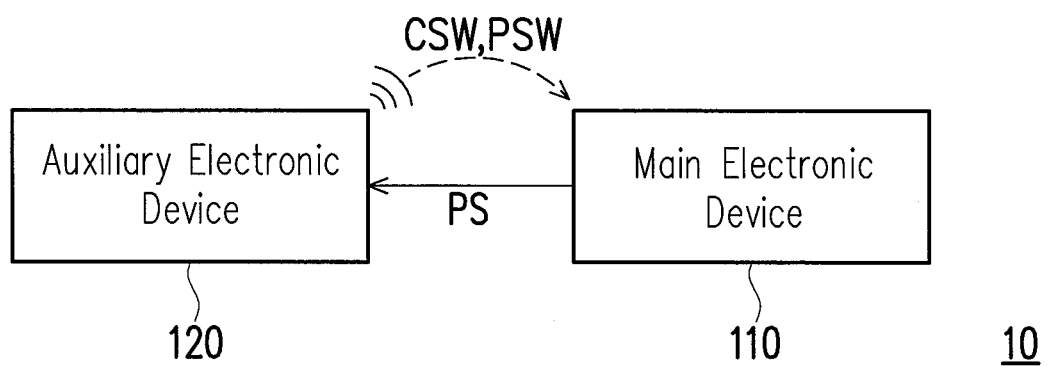
FIG. 1 is a functional block diagram of a communication system according to an embodiment of the invention.

FIG. 1 is a functional block diagram of a communication system according to an embodiment of the invention. With reference to FIG. 1, a communication system 10 includes a main electronic device 110 and an auxiliary electronic device 120. The auxiliary electronic device 120 sends a connection sound wave signal CSW. When the main electronic device 110 receives the connection sound wave signal CSW, the main electronic device 110 sends a positioning signal PS. When the auxiliary electronic device 120 receives the positioning signal PS, the auxiliary electronic device 120 sends a positioning sound wave signal PSW to the main electronic device 110. Moreover, the main electronic device 110 determines a relative position of the auxiliary electronic device 120 and the main electronic device 110 according to the positioning sound wave signal PSW, and the main electronic device 110 displays an operating icon on a display unit of the main electronic device 110 according to the relative position.

In the present embodiment, to prevent the sound waves from affecting the user, the connection sound wave signal CSW could be set as a sound wave having a frequency outside of the decipherable range for human ears. For example, the frequency value may be set in a frequency band outside of 20 Hz-20,0000 Hz. The auxiliary electronic device 120 may include a specific information in the connection sound wave signal CSW. For example, in the present embodiment, the connection sound wave signal CSW include a connection information. When the main electronic device 110 receives the connection sound wave signal CSW, the main electronic device 110 parses the connection sound wave CSW to obtain the connection information, and the main electronic device 110 establishes a connection with the auxiliary electronic device 120 according to the connection information. The main electronic device 110 then sends the positioning signal PS through the connection.

The contents of the connection information may vary according to the type of connection established between the main electronic device 110 and the auxiliary electronic device 120 (e.g., a connection established for signals conforming with a certain standard). In a connection established for radio frequency signals conforming with a Bluetooth standard, for example, the connection information may include a media access control (MAC) address of the auxiliary electronic device 120 corresponding to the Bluetooth standard, a device name of the auxiliary electronic device 120, and a device identification code of the auxiliary electronic device 120.

On the other hand, in other embodiments of the invention, information (e.g. the afore-described connection information) may be included in the connection sound wave signal CSW by using a plurality of different methods. For example, a predetermined frequency band may be divided into a plurality of different frequency values, and the frequency values may be used in sequence to represent different characters. In one example, when the predetermined frequency band is divided into 16 different frequency values, this frequency band may be used to transmit a hexadecimal data (e.g., the MAC address of the auxiliary electronic device). In practice, the predetermined frequency band may be divided into even more frequency values. For example, besides using 16 frequency values to represent the hexadecimal data, other frequency values may be used to represent functional characters such as a start character, an end character, and a spacer character, for instance, although the invention is not limited thereto.

Figure 2:
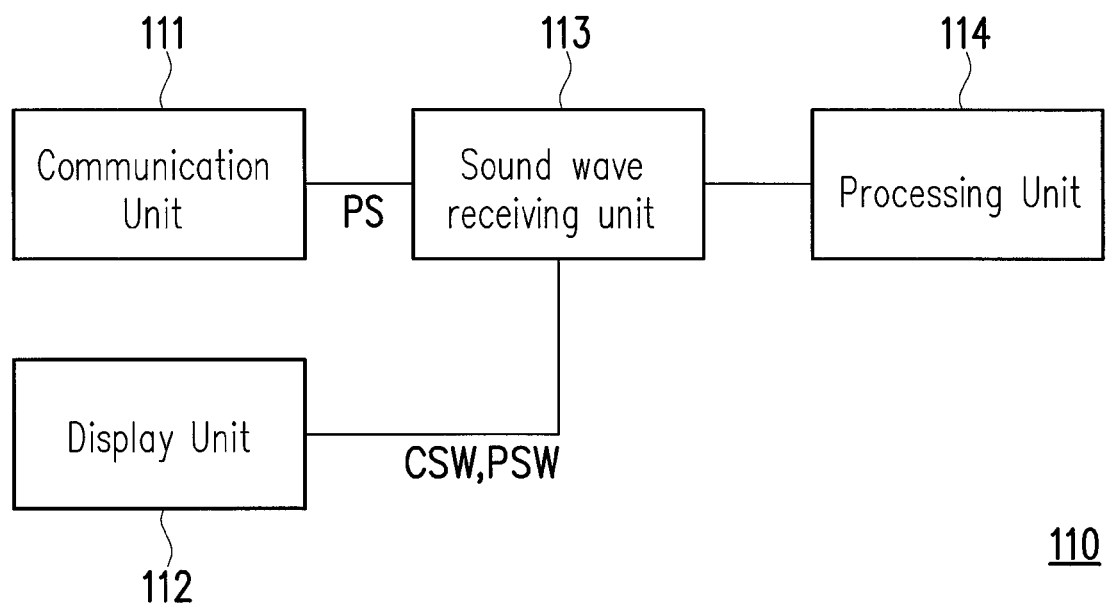
FIG. 2 is a block diagram of an electronic device according to an embodiment of the invention.

FIG 2 is a block diagram of an electronic device according to an embodiment of the invention. The electronic device depicted in FIG. 2 corresponds to the main electronic device 110 in the communication system 10 shown in FIG. 1. With reference to FIG. 2, the electronic device 110 includes a communication unit 111, a sound wave receiving unit 112, a processing unit 113, and a display unit 114. The processing unit 113 is coupled to the communication unit 111 and the sound wave receiving unit 112. The display unit 114 is coupled to the processing unit 113. When the sound wave receiving unit 112 receives the connection sound wave signal CSW, the processing unit 113 sends the positioning signal PS through the communication unit 111 according to the connection sound wave signal CSW. For example, as shown in the afore-described embodiment, the connection information in the connection sound wave signal CSW is used to establish a connection with an auxiliary electronic device (e.g., the auxiliary electronic device 120 depicted in FIG. 1), and this connection is used to transmit the positioning signal PS.

When the processing unit 113 receives the positioning sound wave signal PSW corresponding to the positioning signal PS through the sound wave receiving unit 112, the processing unit 113 determines the relative position of the auxiliary electronic device (e.g., the auxiliary electronic device 120 depicted in FIG. 1) sending the positioning sound wave signal PSW and the electronic device 110 according to the positioning sound wave signal PSW. Moreover, the processing unit 113 controls the display unit 114 to display the operating icon according to the relative position.

In the present embodiment, the sound wave receiving unit 112 may include at least at least two receivers (not shown). The processing unit 113 may use a phase difference between the positioning sound wave signals PSW received by the at least two receivers to determine the relative position of the auxiliary electronic device and the electronic device 110. In embodiments of the invention, since the connection sound wave signal CSW and the positioning sound wave signal PSW are set in frequency bands outside of the decipherable frequencies for human ears, therefore, the receivers must be equipped with high pass filters or band pass filters corresponding to the frequency bands of the connection sound wave signal CSW and the positioning sound wave signal PSW, in order to successfully receive the connection sound wave signal CSW and the positioning sound wave signal PSW. However, the invention is not limited to the afore-described configurations, and variations thereof may be possible due to different implementations.

Furthermore, after the processing unit 113 determines the relative position of the auxiliary electronic device and the electronic device 110, the processing unit 113 may then display the operating icon corresponding to the auxiliary electronic device on the display unit 114 according to the relative position of the auxiliary electronic device and the electronic device 110. For example, the display unit 114 of the electronic device 110 may have a rectangular shape. When the relative position of the auxiliary electronic device and the electronic device 110 corresponds to a side of the rectangular shape, the processing unit 113 may display the operating icon near this side of the display unit 114, and adjust the position of the operating icon according to an actual location of the auxiliary electronic device.

As an example, when the processing unit 113 of the electronic device 110 determines the auxiliary electronic device is located on the left side of the electronic device 110, the processing unit may display the operating icon corresponding to this auxiliary electronic device on the left side of the display unit 114, and adjust the operating icon to a position on the left side according to the location of the auxiliary electronic device. The icon type of the operating icon may be determined in accordance with the type of the auxiliary electronic device (e.g., obtained by the connection information in the connection sound wave signal CSW), such that the user can directly determine the auxiliary electronic device corresponding to the operating icon according to the type of the operating icon and the location of the operating icon on the display unit 114.

When the processing unit 113 receives an operating signal corresponding to this operating icon, such as the user using an input/output unit (e.g., a touch screen, touch panel, mouse, or keyboard of the electronic device 110 (not shown)) the electronic device 110, and the aforementioned operating icon is selected, the processing unit 113 may then execute a file transfer procedure using the communication unit 111 in the electronic device and the connection established with the auxiliary electronic device. The file transfer procedure may include a file or data exchange between the electronic device 110 and the auxiliary electronic device.

For example, the file transfer procedure may include a display interface, so that after the user can use the input/output unit of the electronic device 110 to select the operating icon corresponding to the auxiliary electronic device, the processing unit 113 may display the display interface of the file transfer procedure through the display unit 114. The display interface may include contents such as a file listing of the auxiliary electronic device. The user may complete the file transfer or exchange by dragging the icons corresponding to the file data into this display interface, dragging the icons corresponding to the file data out of this display interface, or by other suitable operating mechanisms.

In the foregoing embodiments, one auxiliary electronic device (e.g., the auxiliary electronic device 120 depicted in FIG. 1) is used in the illustrative scenarios. However, in practice for embodiments of the invention, the main electronic device 110 (e.g., the electronic device shown in FIG. 2) may also simultaneously identify and connect to a plurality of auxiliary electronic devices by using the methods described in the earlier embodiments. Scenarios in which the main electronic device 110 connects to multiple auxiliary electronic devices are described below with complementary figures.

Figure 3:
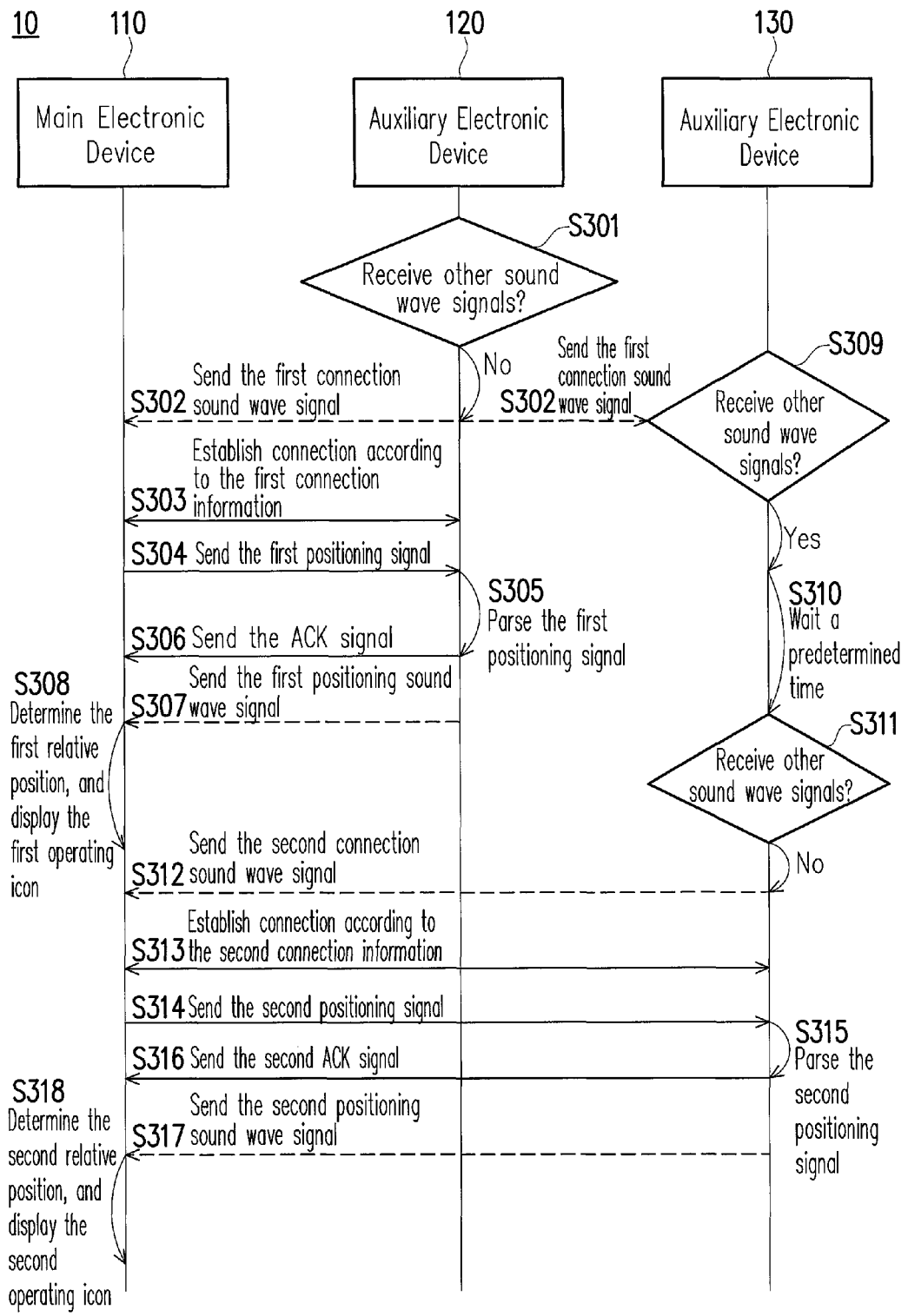
FIG. 3 is a time flow chart of a communication system according to an embodiment of the invention.

FIG 3 is a time flow chart of a communication system according to an embodiment of the invention. With reference to FIG. 3, when the signals transmitted between the devices are sound wave signals, such as the connection sound wave signal CSW or the positioning sound wave signal PSW shown in FIG. 1, the sound wave signals are represented by a dotted line as depicted in FIG. 3. When the signals transmitted between the devices are transmitted by a connection, then the signals are represented by a solid line.

The communication system 10 includes the main electronic device 110 and the auxiliary electronic devices 120 and 130. A central frequency of the connection sound wave signal may be preset in the main electronic device 110 and the auxiliary electronic devices 120 and 130. The auxiliary electronic device 120 uses the receiver (not shown) of the auxiliary electronic device 120 to listen to the frequency bands near the central frequency of the current connection sound wave signal (or listen to a possible frequency range of the positioning sound wave signal) to determine whether there are other sound wave signals (Step S301). If not, the auxiliary electronic device 120 transmits a first connection sound wave signal to the main electronic device (Step S302).

The main electronic device 120 may continually listen on the frequency range of the connection sound wave signal and the positioning sound wave signal. When the first connection sound wave signal sent by the auxiliary electronic device 120 is received, the main electronic device 110 parses the first connection sound wave signal to obtain a first connection information, and establishes a connection with the auxiliary electronic device 120 according to the first connection information (Step S303). After the connection with the auxiliary electronic device 120 is established, the main electronic device 110 may use this connection to transmit a first positioning signal to the auxiliary electronic device 120 (Step S303).

When the auxiliary electronic device 120 receives the first positioning signal through the aforementioned connection, the auxiliary electronic device 120 parses the first positioning signal and obtains the necessary information, such as the central frequency or frequency range of the positioning sound wave signal indicated by the main electronic device 110 (Step S305). In the present embodiment, after the auxiliary electronic device 120 parses the first positioning signal, an acknowledgement (ACK) signal is transmitted to the main electronic device 110 through the aforementioned connection, in order to notify the main electronic device 110 that the first positioning signal has been successfully received (Step S306). Moreover, at the same time, the auxiliary electronic device 120 transmits the first positioning sound wave signal according to the necessary information in the first positioning signal, for example (Step S307). When the main electronic device 110 receives the ACK signal from the auxiliary electronic device 120 through the connection, and receives the first positioning sound wave signal through the sound wave receiving unit (e.g., the sound wave receiving unit 112 depicted in FIG. 2), the relative position (e.g. the first relative position) of the auxiliary electronic device 120 may be determined by using the first positioning sound wave signal, such as by using the phase difference received by the plurality of receivers in the sound wave receiving unit to make the determination. According to the relative position, the main electronic device 110 may then display a first operating icon corresponding to the auxiliary electronic device 120 on the display unit (e.g., the display unit 114 depicted in FIG. 2) of the main electronic device 110.

On the other hand, the auxiliary electronic device 130 uses the receiver (not shown) of the auxiliary electronic device 130 to listen to the frequency bands near the central frequency of the current connection sound wave signal (or listen to a possible frequency range of the positioning sound wave signal) to determine whether there are other sound wave signals (Step S309). At this time, the auxiliary electronic device 130 receives the sound wave signal sent by another electronic device (e.g., the first connection sound wave signal sent by the auxiliary electronic device 120). After the auxiliary electronic device 130 waits for a predetermined period of time (Step S310), whether there are still sound signals sent by other electronic devices is determined again (Step S311). If not, the auxiliary electronic device 130 then transmits the second connection sound wave signal to the main electronic device 110 (Step S312).

The main electronic device 110 may likewise continually listen on the frequency range of the connection sound wave signal and the positioning sound wave signal. When a second connection sound wave signal sent by the auxiliary electronic device 130 is received, the main electronic device 110 parses the second connection sound wave signal to obtain a second connection information, and establishes a connection with the auxiliary electronic device 130 according to the second connection information (Step S312). After the connection with the auxiliary electronic device 130 is established, the main electronic device 110 may use this connection to transmit a second positioning signal to the auxiliary electronic device 130 (Step S314).

When the auxiliary electronic device 130 receives the second positioning signal through the aforementioned connection, the auxiliary electronic device 130 parses the second positioning signal and obtains the necessary information (Step S315). After the auxiliary electronic device 130 parses the second positioning signal, an ACK signal is transmitted to the main electronic device 110 through the aforementioned connection, in order to notify the main electronic device 110 that the second positioning signal has been successfully received (Step S306). Moreover, the auxiliary electronic device 130 simultaneously transmits a second positioning sound wave signal (Step S307). When the main electronic device 110 receives the ACK signal from the auxiliary electronic device 130 through the connection, and receives the second positioning sound wave signal through the sound wave receiving unit, the main electronic device 110 may then use the second positioning sound wave signal to determine a relative position (e.g. a second relative position) of the auxiliary electronic device 130. According to the relative position, the main electronic device 110 may then display a second operating icon corresponding to the auxiliary electronic device 130 on the display unit of the main electronic device 110.

It should be noted that, in the present embodiment, since sound waves traveling through air are prone to interference from ambient sounds, the main electronic device 110 needs to simultaneously receive an ACK signal and a positioning sound wave signal (e.g. the first positioning sound wave signal) returned from a same auxiliary electronic device (e.g. the auxiliary device 120) before the main electronic device 110 determines the relative position of the auxiliary electronic device, in order to reduce the probability of misjudging the relative position of the auxiliary electronic device.

On the other hand, after the afore-described Steps S301-S318 are executed, the relative positions of the main electronic device 110 and the auxiliary electronic devices 120 and 130 may still be changed, such as by the movement of the user. Therefore, after the main electronic device 110 respectively establishes connections with the auxiliary electronic devices 120 and 130, Steps S304-S308 and S314-S318 corresponding to the positioning of the auxiliary electronic devices 120 and 130 are executed periodically. In other words, the main electronic device 110 periodically sends the positioning signal (e.g. the first positioning signal and the second positioning signal) in order to continuously update the positions displayed on the display unit of the main electronic device 110 corresponding to each of the auxiliary electronic devices (e.g. the auxiliary electronic devices 120 and 130).

The main electronic device 110 may periodically send the aforementioned positioning signals continuously by using a plurality of mechanisms, such as a broadcast method or a polling method for sending the aforementioned positioning signals. In the broadcast mechanism for sending the positioning signals, the main electronic device 110 may integrate the information provided for each of the auxiliary electronic devices into a single positioning signal. When each of the auxiliary electronic devices receives this positioning signal, the positioning signal is parsed for the necessary information corresponding to each of the auxiliary electronic devices. For example, the first positioning signal and the second positioning signal shown in FIG. 3 may be integrated into a single positioning signal, and this positioning signal is simultaneously sent to the auxiliary electronic devices 120 and 130.

However, when using the broadcast method to transmit the positioning signals, the main electronic device 110 needs to indicate the central frequency or frequency range of the positioning sound wave signal corresponding to each of the auxiliary electronic devices, so that the main electronic device 110 can successfully identify the positioning sound wave signal returned by each of the auxiliary electronic devices. Accordingly, since each of the auxiliary electronic devices may return positioning sound wave signals at the same or near the same time interval, the main electronic device 110 needs to simultaneously listen to a plurality of frequency ranges and parse the positioning sound wave signals in each of the frequency ranges. Therefore, the calculation complexity of the resolution operation may be higher, which may result in the higher calculation load of the main electronic device 110.

On the other hand, in the polling mechanism for sending the positioning signals, the main electronic device 110 alternately transmits positioning signals to each of the auxiliary electronic devices. After the relative position of an auxiliary electronic device has been determined/updated, the main electronic device 110 then transmits the positioning signal corresponding to another auxiliary electronic device. Since the main electronic device 110 only receives the positioning sound wave signal returned from a single auxiliary electronic device at a same, the positioning sound wave signals returned from each of the auxiliary electronic devices may have the same frequency or have different frequencies. The main electronic device 110 may set the central frequency or the frequency range of the positioning sound wave signal through the positioning signal (e.g. the first positioning signal or the second positioning signal), or the main electronic device 110 may dynamically adjust the central frequency or the frequency range of the positioning sound wave signal according to the surrounding environment.

For example, in the embodiment depicted in FIG. 3, the main electronic device 110 first transmits the first positioning signal, and receives the first positioning sound wave signal (and ACK signal) returned by the auxiliary electronic device 120 corresponding to the first positioning signal, in order to determine/update the first relative position and correspondingly update the position of the first operating icon on the display unit (Steps S304-S308). Thereafter, the second positioning signal is transmitted, and then the main electronic device 110 receives the second positioning sound wave signal (and ACK signal) returned by the auxiliary electronic device 130 corresponding to the second positioning signal, in order to determine/update the second relative position and correspondingly update the position of the second operating icon on the display unit (Steps S314-S318). The main electronic device 110 then periodically executes Steps S304-S308 and Steps S314-S318 continuously and in sequence, so as to track the variations of the relative positions (e.g. the first relative position and the second relative position) of the auxiliary electronic devices 120 and 130 and the main electronic device 110, and to update the positions of the first operating icon and the second operating icon on the display unit of the main electronic device 110.

On the other hand, in the present embodiment, if the main electronic device 110 has not received the ACK signal within a predetermined period after sending the positioning signal (e.g. the first positioning signal), besides excessive levels of ambient interference being the cause for the failed transmission of the ACK signal to the main electronic device 110, the connection termination may also be caused by user movement of the auxiliary electronic device (e.g. the auxiliary electronic device 120) away from the main electronic device 110. Therefore, in the present embodiment, the main electronic device 110 repeatedly transmits the positioning signal (e.g., by transmitting a predetermined quantity of the positioning signal every predetermined time interval).

If the main electronic device 110 has not received the ACK signal returned by the auxiliary electronic device, the main electronic device 110 continually transmits the positioning signal but gradually prolongs the time interval between the positioning signals, until the ACK signal returned by the auxiliary electronic device is received. After the relative position of the auxiliary electronic device and the main electronic device 110 has been re-established, the positioning signal is returned to be transmitted with the original predetermined time interval. However, the invention is not limited to the afore-described configurations. For example, when the main electronic device 110 has not received any ACK signal despite transmitting the predetermined quantity of the positioning signal, the main electronic device 110 may directly terminate the connection with the auxiliary electronic device, and the main electronic device 110 may no longer transmit the positioning signal corresponding to this auxiliary electronic device. Alternatively, the two aforementioned types of implementation mechanisms may be combined (e.g., gradually elongating the time interval, and terminating the connection after sending the predetermined quantity of the positioning signal), the invention is not limited thereto.

In the embodiment depicted in FIG. 3, the auxiliary electronic devices connected with the main electronic device 110 include only the auxiliary electronic devices 120 and 130. However, the invention is not limited to the afore-described configurations and quantity of the auxiliary electronic device. In practice, by using the aforementioned mechanisms of detection, connection, and determination of the relative position, the communication system 10 may include even more auxiliary electronic devices.

Figure 4:
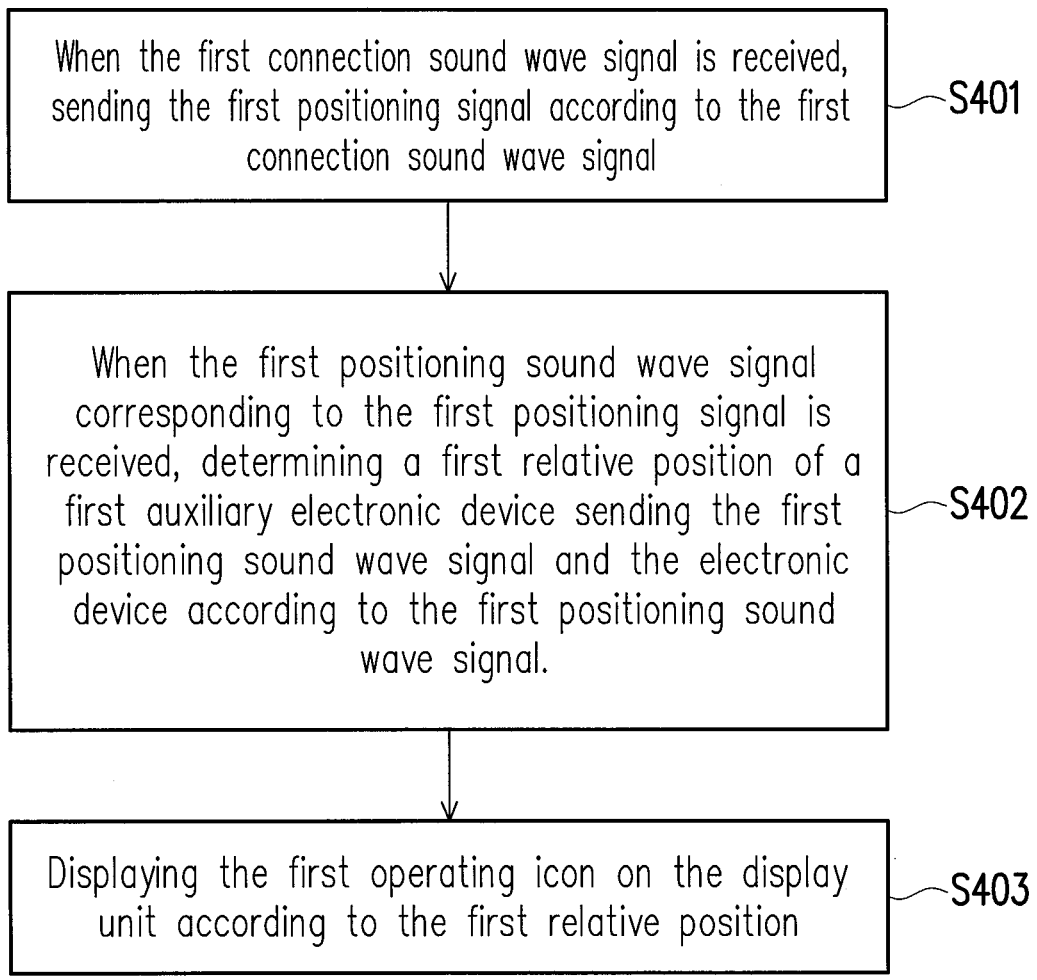
FIG. 4 is a flow diagram of a communication method according to an embodiment of the invention.

Embodiments of the invention further provide a communication method adapted for the electronic devices in a communication system, such as the main electronic device 10 in the communication system 10 depicted in FIGS. 1 and 3, and the electronic device 110 depicted in FIG. 2. FIG. 4 is a flow diagram of a communication method according to an embodiment of the invention. With reference to FIG. 1, in Step S401, when the first connection sound wave signal is received, the first positioning signal is sent according to the first connection sound wave signal. In Step S402, when the first positioning sound wave signal corresponding to the first positioning signal is received, a first relative position of the first auxiliary electronic device sending the first positioning sound wave signal and the electronic device is determined according to the first positioning sound wave signal. In Step S403, the display unit is controlled to display the first operating icon on the display unit according to the first relative position. The detailed implementation of this communication method may be referenced to the description of FIGS. 1-3, and therefore further elaboration thereof is omitted hereafter.

In the invention, the main electronic device 110 and the auxiliary electronic devices 120 and 130 are named only to distinguish the primary and secondary relationships of the electronic devices in the communication system when transmitting messages. The main electronic device 110 and the auxiliary electronic devices 120 and 130 may be any electronic device, such as a smartphone, a tablet computer, a notebook computer, a personal computer, or a digital camera. The user may execute an application program in the main electronic device 110 and the auxiliary electronic devices 120 and 130 to realize the technical contents of the invention. Moreover, the primary and secondary relationships of each electronic device may be determined when the application program is executed (e.g., by selecting a certain electronic device as the main electronic device, and others as the auxiliary electronic devices).

However, the electronic device serving as the main electronic device must at least include a sound wave receiving unit capable of receiving sound waves and using the sound waves to determine the relative position (e.g., a sound wave receiving unit at least including two receivers separated at least by a specific distance), as well as a filter capable of filtering the connection sound wave signal and the positioning sound wave signal. On the other hand, the electronic device serving as the auxiliary electronic device must include a speaker capable of transmitting the connection sound wave signal and the positioning sound wave signal, as well as a sound wave receiving unit and a filter capable of listening to the frequency range of the connection sound wave signal and the positioning sound wave signal. Other configuration settings may be referenced to the afore-described embodiments, and therefore further elaboration thereof is omitted hereafter.

Figure 5:
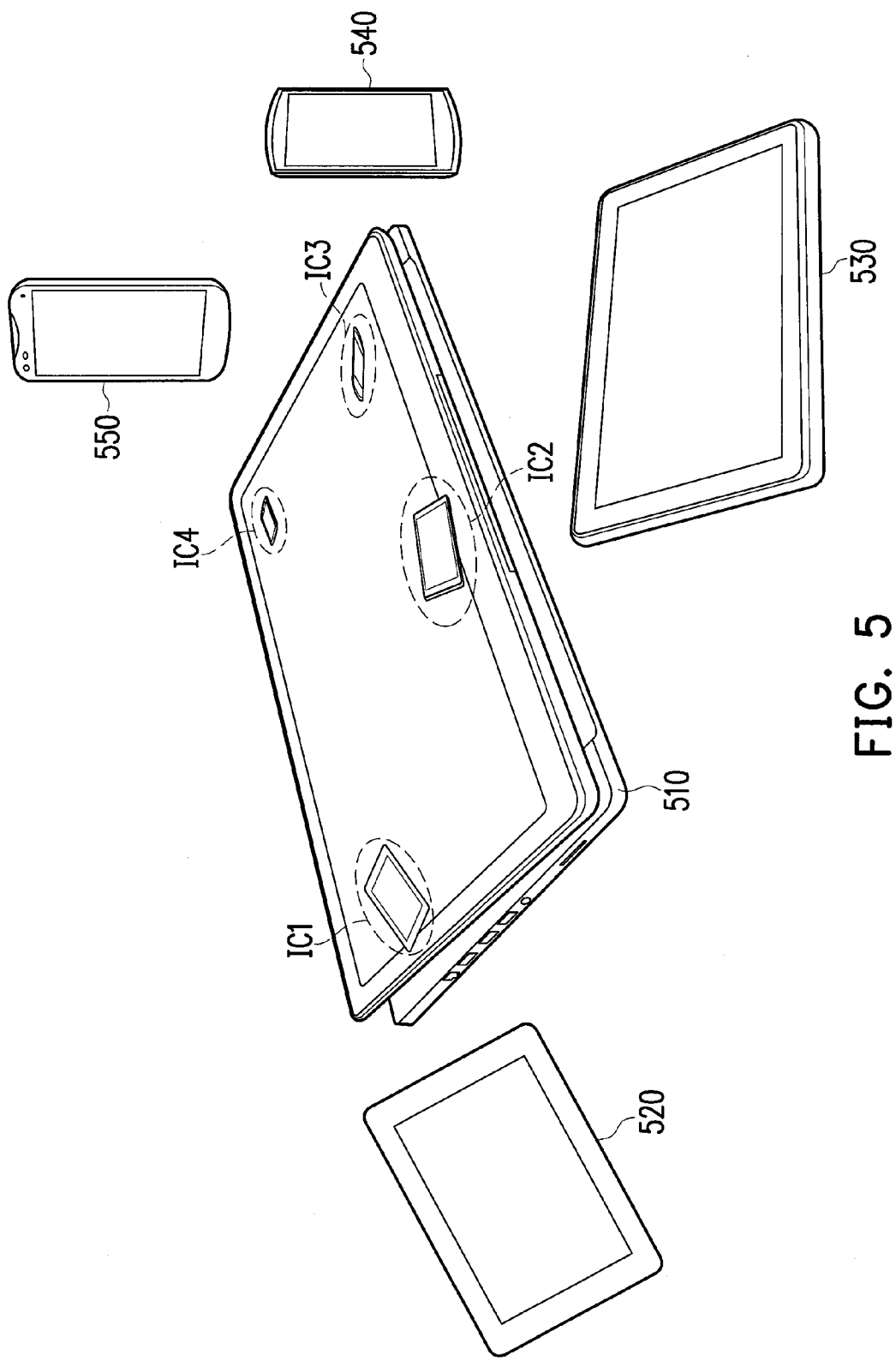
FIG. 5 is a schematic view of a communication system according to an embodiment of the invention.

FIG 5 is a schematic view of a communication system according to an embodiment of the invention. In the present embodiment, the user devices include the tablet computers 510-530 and the smartphones 540 and 550. The relative positions of these devices are shown in FIG. 5, in which the tablet computer 520 is on the left side of the tablet computer 510, the tablet computer 520 is below the tablet computer 510, and the smartphones 540 and 550 are respectively located near the upper edge and lower edge of the right side of the tablet computer 510.

Through user selection (e.g., starting the application program and tapping the selection), the tablet computer 510 may be designated as the main electronic device, and the tablet computers 520 and 530 and the smartphones 540 and 550 may be designated as the auxiliary electronic devices. By the technical schemes described in embodiments of the invention (e.g., using a combination of the steps shown in FIG. 3), the operating icons IC1-IC4 corresponding to the tablet computers 520 and 530 and the smartphones 540 and 550 may be displayed on the touch screen (e.g. the display unit) of the tablet computer 510. Moreover, the locations of each of the operating icons IC1-IC4 on the touch screen corresponds to the relative positions of each device (e.g. the tablet computers 520 and 530, and the smartphones 540 and 550) and the tablet computer 510). That is, the operating icon IC1 corresponding to the tablet computer 520 is located on the left side of the touch screen, the operating icon IC2 corresponding to the tablet computer 530 is located on the bottom side of the touch screen, the operating icon IC3 corresponding to the tablet computer 540 is located on the lower part of the right side of the touch screen, and the operating icon IC4 corresponding to the tablet computer 550 is located on the upper part of the right side of the touch screen.

The user may transmit/exchange files and data by selecting the operating icons IC1-IC4 to open the display interface corresponding to each device (e.g. the tablet computers 520 and 530, and the smartphones 540 and 550). Alternatively, the tablet computer 510 may be used to display or playback the multimedia data on each device (e.g. the tablet computers 520 and 530, and the smartphones 540 and 550), or vice versa.

In view of the foregoing, by using technical frameworks such as sound wave signals to transmit connection information and sound wave signal positioning to determine the relative positions, the communication system, electronic device, and communication method provided by embodiments of the invention enable connections to be established between electronic devices while also simplifying the file/data transfer operations between the electronic devices for the user. Accordingly, the inconvenience of carrying multiple transmission cables or uploading/downloading files can be prevented. The relative positions of the electronic devices are reflected on the display unit of the main electronic device, so that the user can intuitively operate the plurality of auxiliary electronic devices (other connected electronic devices).

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A communication system, comprising:
   a main electronic device; and
   a first auxiliary electronic device configured to transmit a first connection sound wave signal;
   wherein, when the main electronic device receives the first connection sound wave signal, the main electronic device configured to send a first positioning signal according to the first connection sound wave signal;
   wherein, when the first auxiliary electronic device receives the first positioning signal, the first auxiliary electronic device configured to send a first positioning sound wave signal to the main electronic device;
   the main electronic device configured to determine a first relative position of the first auxiliary electronic device and the main electronic device according to the first positioning sound wave signal, and the main electronic device configured to display a first operating icon on a display unit of the main electronic device according to the first relative position;
   a second auxiliary electronic device transmitting a second connection sound wave signal when the first connection sound wave signal is not received; wherein, when the main electronic device receives the second connection sound wave signal, the second auxiliary electronic device configured to send a second positioning signal according to the second connection sound wave signal;
   wherein, when the second auxiliary electronic device receives the second positioning signal, the second auxiliary electronic device configured to send a second positioning sound wave signal to the main electronic device; and
   the main electronic device configured to determine a second relative position of the second auxiliary electronic device and the main electronic device according to the positioning sound wave signal, and the main electronic device configured to display a second operating icon on a second display unit of the main electronic device according to the second relative position.

2. The communication system according to claim 1, wherein: the first connection sound wave signal comprises a connection information, when the main electronic device receives the first connection sound wave signal, the main electronic device configured to parse the first connection sound wave signal to obtain the connection information, establish a connection with the first auxiliary electronic device according to the connection information, and transmit the first positioning signal through the connection.

3. The communication system according to claim 2, wherein: when the main electronic device receives an operating signal corresponding to the first operating icon, the main electronic device configured to execute a file transfer procedure by using the connection.

4. The communication system according to claim 1, wherein:
   the first positioning signal comprises a first frequency value;
   when the first auxiliary electronic device receives the first positioning signal, the first auxiliary electronic device configured to send the first positioning sound wave signal to the main electronic device according to the first frequency value of the first positioning signal;
   the second positioning signal comprises a second frequency value; and
   when the second auxiliary electronic device receives the second positioning signal, the second auxiliary electronic device configured to send the second positioning sound wave signal to the main electronic device according to the second frequency value of the second positioning signal.

5. The communication system according to claim 4, wherein:
   the first frequency value in the first positioning signal and the second frequency value in the second positioning signal are different from each other.

6. The communication system according to claim 1, wherein:
   the main electronic device configured to periodically transmit the first positioning signal and the second positioning signal through a communication unit by using a polling mechanism.

7. An electronic device, comprising:
   a communication unit;
   a sound wave receiving unit;
   a processing unit coupled to the communication unit and the sound wave receiving unit;
   a display unit coupled to the processing unit, wherein, when the sound wave receiving unit receives a first connection sound wave signal, the processing unit configured to send a first positioning signal according to the first connection sound wave signal through the communication unit;
   wherein, when the processing unit receives a first positioning sound wave signal corresponding to the first positioning signal through the sound wave receiving unit, the processing unit configured to determine a first relative position of a first auxiliary electronic device sending the first positioning sound wave signal and the electronic device according to the first positioning sound wave signal, and the processing unit configured to control the display unit to display a first operating icon according to the first relative positions;
   a second electronic device transmitting a second connection sound wave signal when the first connection sound wave signal is not received;
   wherein, when the sound wave receiving unit receives a second connection sound wave signal, the processing unit configured to send a second positioning signal through the communication unit according to the second connection sound wave signal; and
   wherein, when the processing unit receives a second positioning sound wave signal corresponding to the second positioning signal through the sound wave receiving unit, the processing unit configured to determine a second relative position of a second auxiliary electronic device sending the second positioning sound wave signal and the electronic device according to the second positioning sound wave signal, and the processing unit configured to control the display unit to display a second operating icon according to the second relative position.

8. The electronic device according to claim 7, wherein: the first connection sound wave signal comprises a connection information, when the processing unit configured to receive the first connection sound wave signal through the sound wave receiving unit, the processing unit configured to parse the first connection sound wave signal to obtain the connection information, establish a connection with the first auxiliary electronic device according to the connection information, and transmit the first positioning signal through the connection.

9. The electronic device according to claim 7, wherein: when the processing unit receives an operating signal corresponding to the operating icon, the electronic device configured to execute a file transfer procedure by using the connection.

10. The electronic device according to claim 7, wherein: the first positioning signal comprises a first frequency value, and the second positioning signal comprises a second frequency value; and the processing unit configured to perform a listening procedure through the sound wave receiving unit according to the first frequency value and/or the second frequency value.

11. The electronic device according to claim 10, wherein: the first frequency value in the first positioning signal and the second frequency value in the second positioning signal are different from each other.

12. The electronic device according to claim 7, wherein: the processing unit periodically configured to transmit the first positioning signal and the second positioning signal through the communication unit by using a polling mechanism.

13. A communication method adapted for an electronic device in a communication system, the communication method comprising:
when a first connection sound wave signal is received, sending a first positioning signal according to the first connection sound wave signal;
when the first positioning sound wave signal corresponding to the first positioning signal is received, determining a first relative position of a first auxiliary electronic device sending the first positioning sound wave signal and the electronic device according to the first positioning sound wave signal;
controlling a display unit of the electronic device to display a first operating icon according to the first relative position;
a second electronic device transmitting a second connection sound wave signal when the first connection sound wave signal is not received;
when a second connection sound wave signal is received, sending a second positioning signal according to the second connection sound wave signal; and
when a second positioning sound wave signal corresponding to the second positioning signal is received, determining a second relative position of a second auxiliary electronic device sending the second positioning sound wave signal and the electronic device according to the second positioning sound wave signal, and the processing unit controls the display unit to display a second operating icon according to the second relative position.

14. The communication method according to claim 13, wherein the first connection sound wave signal comprises a connection information, and after the first connection sound wave signal is received, the communication method further comprises:
parsing the first connection sound wave signal to obtain the connection information; establishing a connection with the first auxiliary electronic device according to the connection information; and transmitting the first positioning signal through the connection.

15. The communication method according to claim 13, wherein when a processing unit receives an operating signal corresponding to the first operating icon, the electronic device executes a file transfer procedure by using the connection.

16. The communication method according to claim 13, wherein the first positioning signal comprises a first frequency value, the second positioning signal comprises a second frequency value, and after the step of sending the first positioning signal and/or sending the second positioning signal, the communication method comprises: performing a listening procedure through a sound wave receiving unit according to the first frequency value and/or the second frequency value.

17. The communication system according to claim 16, wherein: the first frequency value in the first positioning signal and the second frequency value in the second positioning signal are different from each other.

18. The communication method according to claim 13, wherein after the step of displaying the second operating icon, the communication method further comprises: periodically transmitting the first positioning signal and the second positioning signal by using a polling mechanism.

* * * * *